United States Patent
Nayberg

(10) Patent No.: US 8,359,602 B2
(45) Date of Patent: Jan. 22, 2013

(54) METHOD AND SYSTEM FOR TASK SWITCHING WITH INLINE EXECUTION

(75) Inventor: Howard Israel Nayberg, Plainview, NY (US)

(73) Assignee: CA, Inc., Islandia, NY (US)

( * ) Notice: Subject to any disclaimer, the term of this patent is extended or adjusted under 35 U.S.C. 154(b) by 1372 days.

(21) Appl. No.: 12/034,731

(22) Filed: Feb. 21, 2008

(65) Prior Publication Data

US 2009/0217290 A1 Aug. 27, 2009

(51) Int. Cl.
*G06F 3/00* (2006.01)
*G06F 9/44* (2006.01)
*G06F 13/00* (2006.01)

(52) U.S. Cl. ...................... 718/108; 712/244

(58) Field of Classification Search .................. 718/100, 718/108; 712/244, 228
See application file for complete search history.

(56) References Cited

U.S. PATENT DOCUMENTS

| | | | |
|---|---|---|---|
| 5,339,422 A * | 8/1994 | Brender et al. | 714/4.1 |
| 6,061,711 A * | 5/2000 | Song et al. | 718/108 |
| 6,775,367 B1 * | 8/2004 | Lehtinen | 379/201.12 |
| 7,472,214 B2 * | 12/2008 | Nankaku et al. | 710/264 |
| 7,539,853 B2 * | 5/2009 | Orion et al. | 712/244 |
| 8,171,489 B2 * | 5/2012 | Liu et al. | 718/108 |
| 2006/0107268 A1 * | 5/2006 | Chrabieh | 718/100 |

OTHER PUBLICATIONS

Synchronizing Tasks or SRBs (Pause, Release, and Transfer); URL: http://publib.boulder.ibm.com/infocenter/zos/v1r9/topic.com.ibm.zos.r9.ieaa800/pausrel.htm; Copyright IBM Corporation (1 page), Copyright 1990, 2007.
Serial RB Processing; URL: http://publib.boulder.ibm.com/infocenter/zos/v1r9/topic/com.ibm.zos.r9.ieaa800/susres.htm; Copyright IBM Corporation (1 page), Copyright 1990, 2007.
4.1 Choosing a Serialization Service; URL: http://publibfp.boulder.ibm.com/cgi-bin/bookmgr/BOOKS/iea2a810/TBLTSYNCHS?SHELF=&DT=20010712092712&CASE=&ScrollTOP=TBLTSYNCHS#TBLTSYNCHS; Copyright IBM Corp., Copyright 1988, 2001.

* cited by examiner

*Primary Examiner* — Diem Cao
(74) *Attorney, Agent, or Firm* — Baker Botts L.L.P.

(57) ABSTRACT

The present disclosure is directed to a method and system for task switching with inline execution. In accordance with a particular embodiment of the present disclosure, a first state and a second state are identified for a function executing in the first state. A switch routine is invoked at a particular execution point in the function. A work element is generated in the switch routine. The work element includes status information for the function. The work element is transmitted to at least one alternate state task. The first state is altered to the second state according to the work element. Execution of the function in the second state is resumed at the particular execution point.

20 Claims, 2 Drawing Sheets

METHOD AND SYSTEM FOR TASK SWITCHING WITH INLINE EXECUTION

TECHNICAL FIELD

The present disclosure relates generally to function execution, and more particularly to a method and system for task switching with inline execution.

BACKGROUND

Conventional operating systems and applications include functions that link to other various operating system services and application sub-functions. For example, some functions may execute in a cross memory state. A cross memory state refers to a mode of execution where a function accesses a different address space from its own address space. Functions executing in a cross memory state may include a function that calls other routines residing in a different address space from the calling function. The function executing in a cross memory state may need to change its state to an alternate state (such a non-cross memory state), but making this change during execution of the function is often problematic.

SUMMARY

The present disclosure is related to a method and system for task switching with inline execution. The teachings of the present disclosure allow currently executing functions to change states.

In accordance with a particular embodiment of the present disclosure, a method for task switching with inline execution includes identifying a first state and a second state for a function executing in the first state. The method also includes invoking a switch routine at a particular execution point in the function. The method further includes generating a work element in the switch routine. The work element includes status information for the function. The method further includes transmitting the work element to at least one alternate state task. The method further includes altering the first state to the second state according to the work element. The method further includes resuming execution of the function at the particular execution point in the second state.

Technical advantages of particular embodiments of the present disclosure include a method and system for task switching with inline execution that provides a framework in which a function may invoke a standard call (such as a macro, for example) to switch states and continue the logic flow with the next sequential instruction. Task switching with inline execution facilitates development and reduces the need for specialty routines to accommodate execution state changes.

Further technical advantages of particular embodiments of the present disclosure include a method and system for task switching with inline execution that simplifies execution flow. Thus, development time and the probability of coding errors may be reduced.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF THE DRAWINGS

Operating systems or application programs may include an executing function that reaches a point where it requires an alternate state that it cannot achieve. For example, the calling function may be executing in a cross memory state and may require an alternate state (such as a non-cross memory state). As another example, the calling function may call other routines that do not permit access to functions executing in a cross memory state.

In accordance with the teachings of the present disclosure, a method and system for task switching with inline execution includes a switch routine that allows the function to change states and continue the logic flow inline. The method and system identified in this disclosure are not limited to any specific operating system, sub-system, or application program. The examples illustrated in the accompanying figures will be described with reference to a Multiple Virtual Storage (MVS) operating system. However, other well-known operating systems may also be used.

Figure 1:
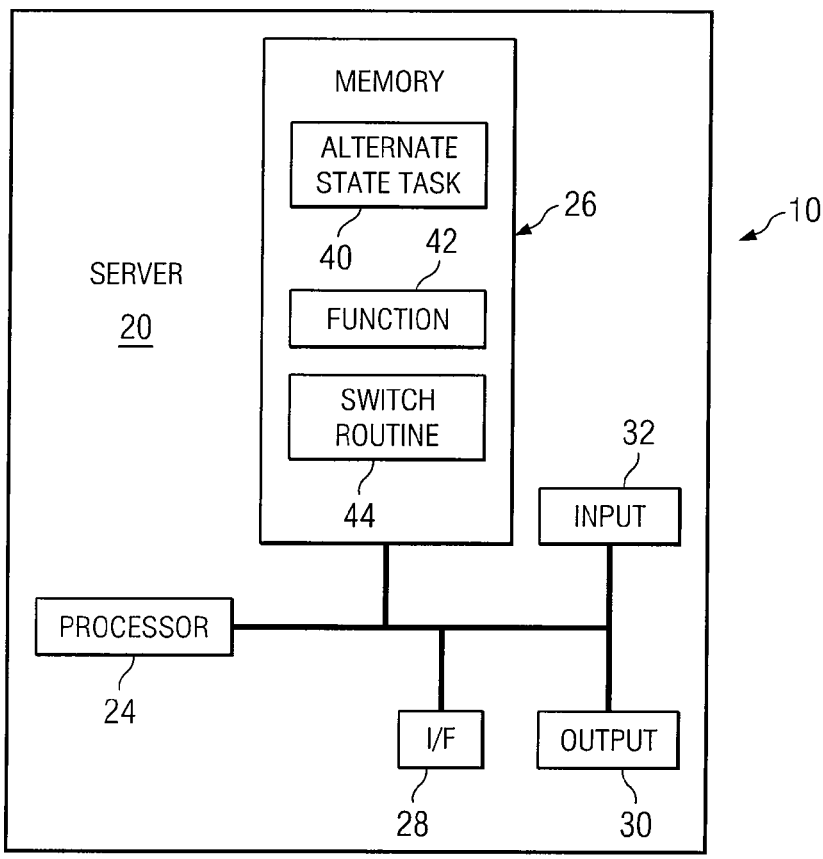
FIG. 1 is a block diagram illustrating a system for task switching with inline execution, according to one embodiment of the present disclosure.

FIG. 1 is a block diagram illustrating a system for task switching with inline execution, according to one embodiment of the present disclosure. As shown in the illustrated embodiment, system 10 generally includes a server 20. Server 20 may refer to any suitable device operable to execute an operating system, sub-system, or application program. According to the illustrated embodiment, server 20 includes a processor 24, a memory device 26, a communication interface (I/F) 28, an output device 30, an input device 32, an alternate state task 40, a function 42, and a switch routine 44.

Alternate state task 40 and switch routine 44 may refer to any suitable logic embodied in computer-readable media, and when executed, that is operable to allow function 42 to change states and continue the logic flow inline. According to one embodiment of the disclosure, alternate state task 40 and switch routine 44 enable a function to change states, such as from a cross memory state to a non-cross memory state, while continuing the logic flow of function 42 in a direct manner. Enabling a function to change states facilitates development by reducing the number of specialized tasks or other units of work, and reduces debugging effort because the logic flow is direct from the perspective of function 42.

According to one embodiment of the disclosure, alternative state task (AST) 40 may be a separate unit of work (from the perspective of the operating system). The unit of work may be started in the address space that it serves by an attach macro, schedule macro, or any other suitable method executed by a higher-level task. The method of attachment may be determined by the type of unit of work. For example, MVS tasks may use an MVS ATTACH (or its alternate form ATTACHX) macro. Service request blocks (SRBs) may be started via an MVS SCHEDULE or IEAMSCHED macro, as examples. The classification of AST 40 (task or SRB) may determined by the requirements of function 42 and therefore there may be more than one AST 40 in any given address space.

According to one embodiment of the disclosure, switch routine 44 refers to logic for a calling function 42 to switch to an AST 40. Switch routine 44 may collect any data to identify state of the calling function 42 for the AST 40. This may include environment values such as general register values, access register values, and a program execution key. According to one embodiment, at least a portion of the current MVS linkage stack may be saved by switch routine 44.

According to one embodiment of the disclosure, function 42 may invoke switch routine 44 using, for example, a call macro. Switch routine 44 may save the above data in a work element (WE). The WE may include a pointer to an event control block (ECB) and an address space identifier. The ECB may reside in the home address space of the currently active MVS unit of work, as an example.

According to one embodiment of the disclosure, a value in a general register, also referred to as General Register 14 or R14, may refer to a particular execution point by standard linkage conventions, such as the return point upon completion of a called function. Therefore, R14 may point to an instruction following a call macro. This address may provide the resume point in the WE, which may be used by AST 40 to enter the current position in function 42's logical flow.

Switch routine 44 may queue the WE to an appropriate AST 40 and invoke AST 40 via an MVS post macro, as an example. Switch routine 44 waits via a wait macro, as an example, on the ECB pointed to from the WE, such that AST 40 may reach the return call and notify switch routine 44 to continue.

When switch routine 44 is notified, it may extract from the WE the current values of the general register values and the access register values, which reflect the values at the time of the return call. According to one embodiment of the disclosure, some portion of the MVS linkage stack and the program execution key may not be extracted and restored. The program execution key may be used by AST 40 to ensure the inline logic executes with the program execution key originally in use by function 42 and not that generally used by AST 40. According to another embodiment, some portion of the MVS linkage stack and program execution key may be saved and restored when AST 40 returns control to the original unit of work, as described in more detail below with reference to FIG. 2.

According to one embodiment of the disclosure, switch routine 44 may clean up the WE and the ECB, restore general and access registers, and return control to function 42 under the original unit of work. According to one embodiment, switch routine 44 may return control to function 42 via the value in R14. This value, by standard linkage conventions, points to the resume address after a called function. On the return call from the inline code, the value of R14 points to the next instruction, which is the instruction that switch routine 44 will pass control to as the last action. Additional details of AST 40, function 42, and switch routine 44 are provided below with reference to FIG. 2. Additional details of server 20 in FIG. 1 are provided below.

Processor 24 may refer to any suitable device operable to execute instructions and manipulate data to perform operations for server 20. Processor 24 may include, for example, any type of central processing unit (CPU).

Memory device 26 may refer to any suitable device operable to store and facilitate retrieval of data. Memory device 26 may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding. Although AST 40, function 42, and switch routine 44 are illustrated as being in memory device 26, AST 40, function 42, and switch routine 44 may be located in one or more memory devices 26.

Communication interface (I/F) 28 may refer to any suitable device operable to receive input for server 20, send output from server 20, perform suitable processing of the input or output or both, communicate to other devices, or any combination of the preceding. Communication interface 28 may include appropriate hardware (e.g. modem, network interface card, etc.) and software, including protocol conversion and data processing capabilities, to communicate through a LAN, WAN, or other communication system that allows server 20 to communicate to other devices. Communication interface 28 may include one or more ports, conversion software, or both.

Output device 30 may refer to any suitable device operable for displaying information to a user. Output device 30 may include, for example, a video display, a printer, a plotter, or other suitable output device. In other embodiments, output device 30 may include a magnetic disk, flash memory, optical disk, or other suitable data storage device.

Input device 32 may refer to any suitable device operable to input, select, and/or manipulate various data and information. Input device 32 may include, for example, a keyboard, mouse, graphics tablet, joystick, light pen, microphone, scanner, or other suitable input device. In other embodiments, input device 32 may include a magnetic disk, flash memory, optical disk, or other suitable data storage device.

Figure 2:
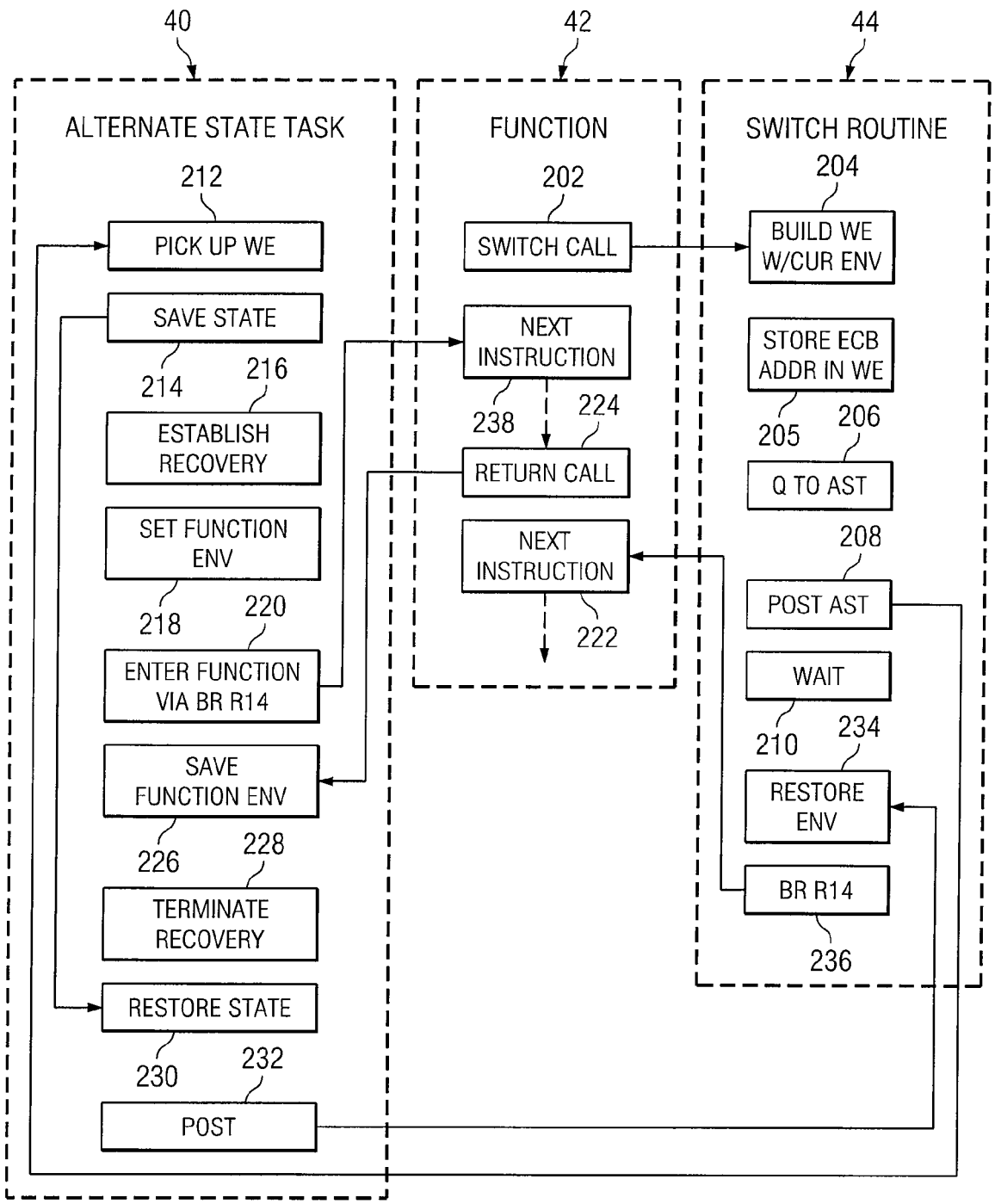
FIG. 2 is a diagram illustrating an example alternate state task, function, and switch routine, according to one embodiment of the present disclosure.

FIG. 2 is a diagram illustrating an example AST 40, function 42, and switch routine 44, according to one embodiment of the present disclosure. As described above, AST 40 and switch routine 44 are operable to allow a function 42 to change states and continue the logic flow inline. According to one embodiment of the disclosure, this is accomplished via a call at step 202 to switch routine 44. Switch routine 44 builds a work element (WE) at step 204 that contains status information and environment variables to resume execution of function 42 at the particular execution point the call to switch routine 44 was made. An Event Control Block (ECB) is obtained in the Home Address Space and that address is stored in the WE at step 205. The WE is queued to AST 40 at step 206 and AST 40 is notified via a post call that work has been queued at step 208. Next, the unit of work is put to sleep (put into a wait state at step 210, as an example) until such time that it is awoken via a post of the ECB obtained in step 205.

AST 40 recognizes the arrival of the WE and begins processing it at step 212. AST 40 saves its current state and environment at step 214 and establishes recovery at step 216 so it can easily return to its current state and environment in the event an abnormal end such as an error. AST 40 then begins making changes so that it operates similar to function 42 at the time of the switch call 202 (information may come from the WE, for example) at step 218. For example, these changes may include setting environment values including general register values, access register values, and an execution key. At step 220, AST 40 resumes the code path of function 42 via register R14 with the next instruction 238 following switch call 202. At step 238, function 42 is executing in the alternate state. Thus, switch routine 44 and AST 40 facilitate executing in the alternate state without a specialized unit of work in the requested state and any extra code to support that unit of work. Further, AST 40 is not function specific and may be applied to a variety of functions 42.

At step 224, function 42 switches back to its original state (at the time of the switch call 202) by issuing a return call. When control returns to the instruction following the switch, function 42 will be executing in the state prior to the switch call 202.

At step 226, the environment values such as general register values, access register values, and the execution key of function 42 are saved and eventually transferred to the WE. The recovery established by the AST 40 is terminated at step 228 and the state and environment of AST 40 is restored at step 230. AST 40 notifies the unit of work originally processing function 42 and waiting in switch routine 44. This is accomplished via a post at step 232, which posts the Event Control Block (ECB) obtained in step 205 and pointed to from within the WE.

At step 234, switch routine 44 cleans up the WE and ECB. Switch routine 44 restores environment values such as the general register values and access register values. Finally, at step 236, switch routine 44 transfers control to the next instruction 222 following return call 238 via register R14.

According to one embodiment of the disclosure, AST 40 may provide recovery in the event of an error. For example, AST 40 may assume various environmental attributes of its caller such as general register contents, access register contents, and execution key based on the contents of the WE. AST 40 may save its state and environment in a manner that enables AST 40 to reinstate itself upon a return call or in the event of an abnormal end while executing of behalf of its caller.

For example, AST 40 may save the address just beyond the point in its logic flow into R14, where under normal conditions the AST 40 state and environment will be restored (as indicated by the arrow from save state 214 to restore state 230 in FIG. 2). AST 40 may first set the resume address to the address in R14. AST 40 may create an MVS linkage stack entry via a branch and stack instruction, and thereby save its current state and environment including the current program status word, current register values including general register values including the resume point set in R14, access register values, and control register values. According to one embodiment, a Modify Stack (MSTA) instruction may be used to insert an identifier and the address of the WE in the stack entry created in step 214 thereby enabling proper identification of said stack entry.

According to one embodiment of the disclosure, there may be relationship between extended recovery routines in MVS and the MVS linkage stack. In the event of an abnormal end condition, a recovery routine may receive control. MVS may reset the current stack entry pointer to point to the then current stack entry at the time the recovery environment was established. Therefore, after setting up the stack entry as described above, a recovery environment may be established via an MVS ESTAE macro instruction. At this point, it may be safe to alter the environment to match that of the calling function 42 and pass control to the calling function 42.

Once control returns via the return call, general registers may be saved into a standard save area according to standard linkage conventions. The load relative address long (LARL) instruction establishes minimal address ability. The current stack entry is verified by extracting the modifiable area via an extract status (ESTA) instruction. A check for the identifier is performed and access is granted to the WE. With access to the WE, the general registers and access registers are saved as they existed at the time of the return call in the WE for eventual restoration by switch routine 44. According to one embodiment of the disclosure, if the state of program execution key and a portion of the linkage stack is to be carried back to function 42, the capture of these states may be incorporated into the logic as described above.

Once status at the time of the return call is saved, the recovery environment established to trap an abnormal end while running on behalf of function 42 is terminated. This is accomplished, in one embodiment, via an MVS ESTAE macro instruction, as an example. With the recovery environment terminated, the environment for AST 40 may be restored. This is accomplished, in one embodiment, by unstacking the stack entry specifically created for this purpose via a program return (PR) instruction. Processing within AST 40 continues with the posting of the wait issued from within switch routine 44.

According to one embodiment of the disclosure, in the event of an abnormal end occurring when AST 40 is running on behalf of function 42, some special handling may be performed to document the abnormal condition, recover AST 40, and notify function 42 of the condition. If an abnormal end occurs, the operating system passes control to a recovery routine. This routine will dump the three address spaces: 1) primary, 2) secondary, and 3) home (duplicate references to the same address space may be resolved by the MVS dump processing). The original unit of work is identified by the recovery routine and the recovery routine may call the MVS recovery and termination Manager (RTM) via an MVS CALLRTM macro to send the error back to function 42. This may appear in function 42 by driving the recovery routine established by switch routine 44.

After collection of the documentation, the retry routine in AST 40 may receive control. Since documentation has already been gathered, the retry routine restores the state and environment for AST 40. The recovery environment built prior to calling the function specific code is terminated and the state and environment for AST 40 is restored by unstacking the stack entry via the program return (PR) instruction, as is done in the case of a normal return via the return call. A flag may be set by the recovery routine in the WE to indicate that an abnormal end has occurred. AST 40 resumes normal processing and looks for the next WE to begin processing the next request.

According to one embodiment of the disclosure, the recovery routine for switch routine 44 cleans up any control blocks created by switch routine 44 including the WE. Switch routine 44 may then send the error to function 42, which may or may not have created its own recovery. The recovery of function 42 can take any function specific action it may deem appropriate for the error.

According to one embodiment of the disclosure, a task management block may include a function number. The function number may allow function 42 to identify the type of AST 40 such that switch routine 44 can build and queue the WE appropriately. It should be noted that type refers to an expression that differentiates one AST 40 from another. For example, AST 40 units of work may be grouped together by assigning them the same function number to facilitate multi-programming and/or multitasking.

As an example of the function number, two ASTs 40 may each have a different function number. One AST 40 may include a task in a non-cross memory state and a second AST 40 may include a SRB in a non-cross memory state. Function 42, running in a cross memory state, may request different states to accomplish various actions. An additional example would be the desire to run on a particular processor. Identifying the specific unit of work (AST 40) on the call enables the function to make a portion of the logic flow enabled for the particular processor via a simple call.

As another example of the function number, certain functions may be single threaded. A number of units of work (or threads) may loop through a given set of functions 42. There may be one or more sequences of instructions that may be single threaded. A single AST 40 with a unique function number running in the same state (or different state) as the calling function 42 may be used. The calling function 42 may specify the same function number for all calls, thus forcing switch routine 44 to queue requests to one AST 40. Further, one AST 40 may use the specific function number to accomplish single threading.

According to one embodiment of the disclosure, synchronizing the execution of programs may be accomplished using any suitable technique. For example, as described above, wait and post (as indicated by reference numbers 210 and 232, respectively) logic may be used to synchronize execution. As another example, if the units of work are SRBs, other suitable techniques may be used, such as a "pause, release, and transfer" technique or a "suspend and resume" technique. The present disclosure contemplates numerous synchronization techniques and embodiments of the disclosure may include some, all, or none of the enumerated techniques.

Figure 3:
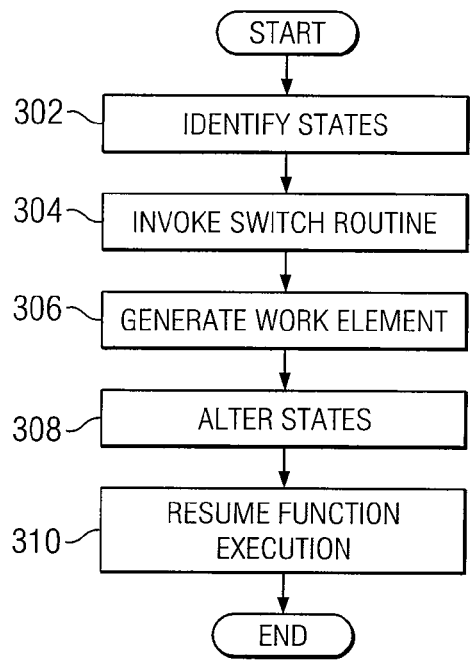
FIG. 3 is a flow diagram illustrating a method for task switching with inline execution, according to one embodiment of the present disclosure.

FIG. 3 is a flow diagram illustrating a method for task switching with inline execution, according to one embodiment of the present disclosure. The method begins at step 302 where a first state and a second state are identified for a function. For example, the function may be executing in a cross memory state and it may request a non-cross memory state. At step 304, a switch routine is invoked at a particular execution point in the function. At step 306, a work element is generated. For example, the work element may include status information for the function and it is transmitted to at least one alternate state task. At step 308, the first state is altered to the second state according to the work element. At step 310, execution of the function is resumed at the particular execution point, and the function resumes execution in the second state.

It should be understood that some of the steps illustrated in FIGS. 2 and 3 may be combined, modified or deleted where appropriate, and additional steps may also be added to the flowchart. Additionally steps may be performed in any suitable order without departing from the scope of the disclosure.

Numerous other changes, substitutions, variations, alterations and modifications may be ascertained by those skilled in the art and it is intended that the present disclosure encompass all such changes, substitutions, variations, alterations and modifications as falling within the spirit and scope of the appended claims. Moreover, the present disclosure is not intended to be limited in any way by any statement in the specification that is not otherwise reflected in the claims.

What is claimed is:

1. A method, comprising:
   identifying a first state and a second state for a function, the function executing in the first state;
   invoking a switch routine at a particular execution point in the function;
   generating, in the switch routine, a work element, the work element comprising status information for the function;
   transmitting the work element to at least one alternate state task;
   altering the first state to the second state according to the work element; and
   resuming execution of the function at the particular execution point in the second state.

2. The method of claim 1, wherein altering the first state to the second state according to the work element comprises altering at least one general register value, at least one access register value, and at least one execution key.

3. The method of claim 1, further comprising altering the second state to the first state by invoking a return routine.

4. The method of claim 1, further comprising: storing at least one address reference operable to identify the particular execution point;
   identifying an error; and
   restoring the function at the particular execution point according to the at least one address reference.

5. The method of claim 1, wherein the first state comprises a cross memory state and the second state comprises a non-cross memory state.

6. The method of claim 1, wherein invoking a switch routine at a particular execution point in the function comprises invoking a macro.

7. The method of claim 1, wherein the work element comprising status information for the function comprises at least one general register value, at least one access register value, and at least one execution key.

8. A system, comprising:
   a processor; and
   a storage device embodying a program of instructions operable, when executed on the processor, to:
   identify a first state and a second state for a function, the function executing in the first state;
   invoke a switch routine at a particular execution point in the function;
   generate a work element, the work element comprising status information for the function;
   transmit the work element to at least one alternate state task;
   alter the first state to the second state according to the work element; and
   resume execution of the function at the particular execution point in the second state.

9. The system of claim 8, wherein the program of instructions is further operable to alter at least one general register value, at least one access register value, and at least one execution key.

10. The system of claim 8, wherein the program of instructions is further operable to alter the second state to the first state by invoking a return routine.

11. The system of claim 8, wherein the program of instructions is further operable to:
    store at least one address reference operable to identify the particular execution point;
    identify an error; and
    restore the function at the particular execution point according to the at least one address reference.

12. The system of claim 8, wherein the first state comprises a cross memory state and the second state comprises a non-cross memory state.

13. The system of claim 8, wherein the program of instructions is further operable to invoke a macro.

14. The system of claim 8, wherein the work element comprising status information for the function comprises at least one general register value, at least one access register value, and at least one execution key.

15. Logic encoded in non-transitory media, the logic being operable, when executed on a processor, to:
    identify a first state and a second state for a function, the function executing in the first state;
    invoke a switch routine at a particular execution point in the function;
    generate a work element, the work element comprising status information for the function;
    transmit the work element to at least one alternate state task;
    alter the first state to the second state according to the work element; and resume execution of the function at the particular execution point in the second state.

16. The logic of claim 15, wherein the logic is further operable to alter at least one general register value, at least one access register value, and at least one execution key.

17. The logic of claim 15, wherein the logic is further operable to alter the second state to the first state by invoking a return routine.

18. The logic of claim 15, wherein the logic is further operable to:
store at least one address reference operable to identify the particular execution point;
identify an error; and
restore the function at the particular execution point according to the at least one address reference.

19. The logic of claim 15, wherein the first state comprises a cross memory state and the second state comprises a non-cross memory state.

20. The logic of claim 15, wherein the work element comprising status information for the function comprises at least one general register value, at least one access register value, and at least one execution key.

* * * * *